C. A. HARRIS.
Hand-Plow.
No. 69,803.
Patented Oct. 15, 1867.
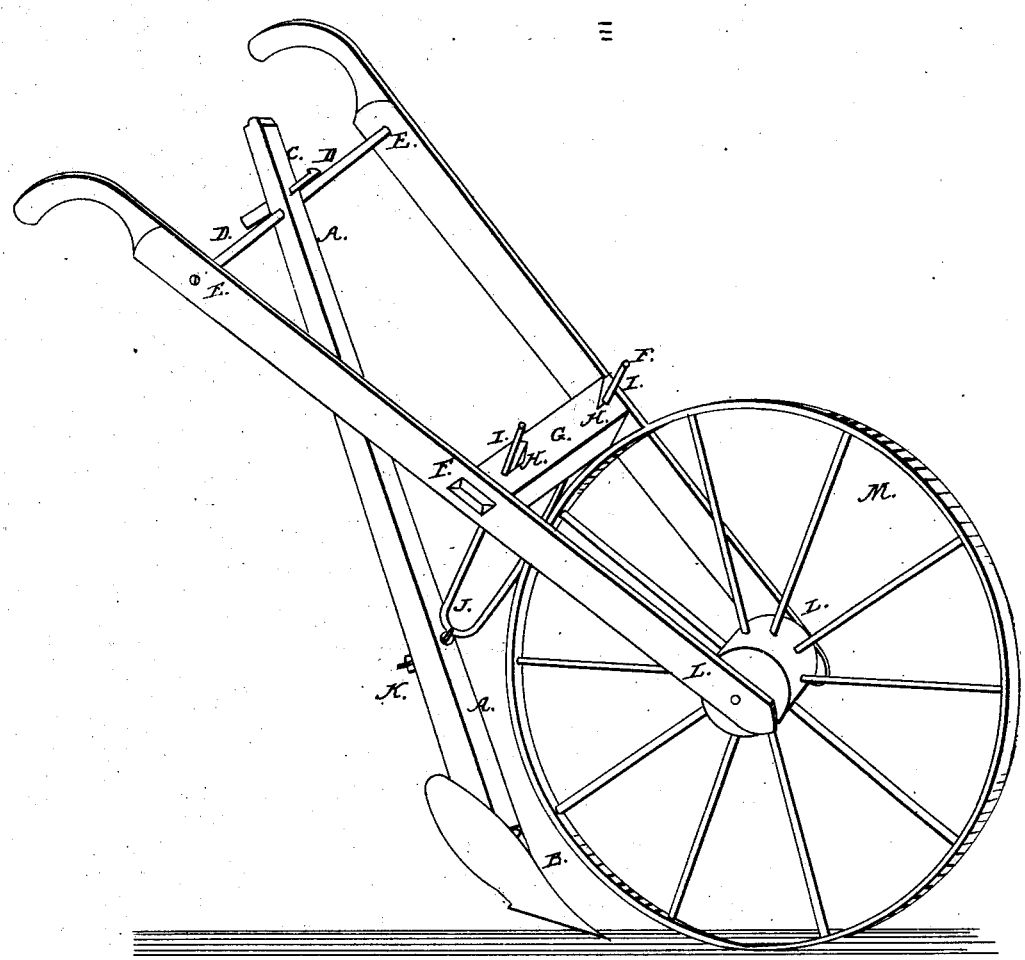
Witnesses:
Inventor:

United States Patent Office.

CAMRELS A. HARRIS, OF AUSTIN, ARKANSAS.

Letters Patent No. 69,803, dated October 15, 1867.

IMPROVEMENT IN GARDEN-PLOUGH CULTIVATOR.

*The Schedule referred to in these Letters Patent and making part of the same.*

TO ALL WHOM IT MAY CONCERN:

Be it known that I, CAMRELS A. HARRIS, of the town of Austin, in the county of Prairie, in the State of Arkansas, have invented a new and useful Improvement on Hand-Ploughs, the nature of which consists in the combination of the parts, as set forth in the accompanying drawings and specification, so as to form a speedy and efficient garden-cultivator; and I do hereby declare that the following is a full and exact description thereof, reference being had to the accompanying drawings, and to the letters of reference marked thereon.

To enable others skilled in the art to make and use my invention, I will proceed to describe its construction and operation.

I construct my helve A A as shown in accompanying drawing, to the lower end of which I attach my plough (whether turning-shovel, butting, or any other known form of plough adapted to the stock which may suit my convenience) B by an ordinary screw-bolt and tap, the bolt extending through a portion of the plough and through the helve, as shown in drawing. Through the top of helve, as shown at C, in a mortise for that purpose, I insert a key-wedge, and in connection therewith, at right angles, a cross-arm, D D, the key-wedge making a strong and adjustable connection with it and helve. Each extremity of arms is, by means of an auger-hole, inserted in handles, extending through and fastened by means of pin or wedge, as shown at E E. At F F, on handles, I insert cross-bar G by mortises and tenons, pinned securely through cross-bar. At H H are inserted stay-rods I I, which unite at $j$, and, extending through helve, are fastened by ordinary screw-tap at K. The upper ends of said rods are supplied with key-wedges, running through cross-bar, parallel and in connection with said rods, by means of mortise, for the purpose of adjusting the plough to any given depth of soil, and securing the rods at that point. At L L, in handles, and a sufficient distance from cross-bar, proportionate with diameter of wheel, so as to insure a free working of same, are to be seen journals of wheel M.

To operate the plough, take hold of each handle, elevating them so the point of the plough is clear of the ground. Then place the wheel where you wish to commence ploughing; gradually lower the handles until they assume an easy position; then push or roll the wheel forward by means of the handles, taking care that it tracks exactly where you want the plough to furrow. Should the plough run too shallow, lengthen the stay-rods through cross-bar until you have the depth desired; then fasten them securely by driving the key-wedges on them.

What I claim as my invention, and desire to secure by Letters Patent, is—

The peculiar combination of the several parts (forming a valuable and efficient garden-cultivator or hand-plough) set forth in accompanying drawings and described in specification, whether constructed of wood, metal, or any other material, substantially the same or answering the same purpose.

CAMRELS A. HARRIS.

Witnesses:
    JAS. H. FLEMING,
    WM. E. ROBINSON.